United States Patent [19]

Meulenbrugge et al.

[11] Patent Number: 5,530,238
[45] Date of Patent: Jun. 25, 1996

[54] IMAGE DETECTION DEVICE HAVING CORRECTION CIRCUIT FOR REMOVING ARTIFACTS DUE TO DELAYED CHARGE TRANSFER

[75] Inventors: Hendrik J. Meulenbrugge, Eindhoven, Netherlands; Ulrich Schiebel; Herfried K. Wieczorek, both of Aachen, Germany

[73] Assignee: U.S. Philips Corporation, New York, N.Y.

[21] Appl. No.: 299,774

[22] Filed: Sep. 1, 1994

[30] Foreign Application Priority Data

Sep. 3, 1993 [EP] European Pat. Off. ............ 93202578

[51] Int. Cl.$^6$ .................................. H04N 3/14; H04N 5/32
[52] U.S. Cl. .................. 250/208.1; 348/250; 378/98.8
[58] Field of Search .................... 250/208.1, 559.05, 250/559.07, 559.08, 581, 584; 348/241, 248, 249, 250, 294, 308, 311, 317; 378/98.12, 98.8, 901

[56] References Cited

U.S. PATENT DOCUMENTS

| | | | |
|---|---|---|---|
| 4,742,396 | 5/1988 | Bell | 348/249 |
| 5,018,179 | 5/1991 | Kaneko | 378/98.12 |
| 5,083,024 | 1/1992 | Takeda et al. | 250/584 |
| 5,184,018 | 2/1993 | Conrads et al. | 250/370.09 |
| 5,331,682 | 7/1994 | Hsieh | 378/19 |

FOREIGN PATENT DOCUMENTS

| | | |
|---|---|---|
| 0422817 | 4/1991 | European Pat. Off. . |
| 2178232 | 2/1987 | United Kingdom . |

*Primary Examiner*—Edward P. Westin
*Assistant Examiner*—John R. Lee
*Attorney, Agent, or Firm*—Jack D. Slobod

[57] ABSTRACT

An image detection device, notably a semiconductor image detection array for detecting x-ray images, is provided wherein perturbations due to phantom-images are substantially mitigated. In such an image detection array incident image carrying radiation is converted into charges. Delayed charge transfer due to trapping of charges in the semiconductor material of radiation sensor elements causes such perturbations. In an image detection device according to the invention a correction circuit is provided which is arranged to form an image correction signal being representative of delayed transferred charges. In a particular embodiment of an image detection device according to the invention the image correction signal is formed as a superposition of exponentially decaying signals of images which were detected before the detection of a currently detected image. An image signal containing artifacts due to delayed charge transfer is formed by a read-out circuit whereto charges formed by the radiation sensor elements are transferred. A corrected image signal is subsequently formed from the image correction signal and the signal formed by the multiplex circuit.

5 Claims, 3 Drawing Sheets

IMAGE DETECTION DEVICE HAVING CORRECTION CIRCUIT FOR REMOVING ARTIFACTS DUE TO DELAYED CHARGE TRANSFER

BACKGROUND OF THE INVENTION

1. Field of the Invention

The invention relates to an image detection device comprising an image detection array which incorporates radiation sensitive elements to convert incident radiation into charges, and read-out-lines to transfer said charges to a read-out circuit which is arranged to convert transferred charges into a primary electronic image signal. The invention aim relates to an x-ray examination apparatus provided with an image detection array.

2. Description of the Related Art

An image detection array of said kind has been described in the European Patent Application EP 0 440 282 which corresponds to commonly-owned U.S. Pat. No. 5,184,018.

In the cited reference an image detection array is described which is in particular intended for use in an x-ray examination apparatus. X-ray examination is performed by irradiating a patient with an x-ray beam, so that an x-ray image is formed on an x-ray detector. The x-ray detector of the x-ray examination apparatus of the cited reference has the form of an image detection array. The x-ray image can either be converted into charges by the radiation sensitive semiconductor elements, or the x-radiation which is incident on the x-ray detector can be first converted by a scintillator layer e.g. a CsI:Tl layer into electromagnetic radiation of a longer wavelength, notably in the region between ultraviolet and infrared radiation. Next, the radiation produced by the scintillator layer is converted into charges by the semiconductor elements. The semiconductor elements may consist e.g. of $\alpha$-Si:H, $\alpha$-Se, or $\alpha$-Se:As which are sensitive to x-radiation, or $\alpha$-Si:H semiconductor elements covered by a CsI:Tl layer can be employed. The radiation sensitive elements of the array are arranged in rows and columns, so that the image detection array is shaped as an image detection matrix. The charges are read-out by way of read lines under control of a row-driver circuit which controls switching elements e.g. having the form of thin-film field effect transistors which are provided for each of the radiation sensitive elements. The read lines transfer the charges to a read-out circuit which forms a primary electronic image signal from the transferred charges. The primary electronic image signal is employed to display the image which is detected by the x-ray detector on a monitor, store the image information in an image memory or make a hard-copy of the image.

In the primary electronic image signal formed by an image detection array of the cited reference, artifacts due to memory effects can occur, adversely affecting the diagnostic quality of the stored and/or displayed images. Such artifacts notably have the form of phantom images and are particularly disturbing during fluoroscopy operation where a sequence of images is made at a low level of x-irradiation. The memory effects are caused by the fact that charges which are formed in the semiconductor material by the incident radiation become temporarily trapped in localised energy levels having an energy in the bandgap of the semiconductor material. The trapping of charges also causes a reduction of the amplitude of the primary electronic image signal. When trapped charges are thermally released with some time-delay they give rise to a phantom image which causes disturbances in a sequence of x-ray images because phantom images of an earlier image become superimposed on a next image in the sequence. Phantom-images occur especially just after one or a series of high-dose x-ray exposures have been made. A further cause of phantom images is the delay due to electrical capacitances of the radiation sensitive elements. Consequently, the transfer of charges to the read-out circuit is delayed and phantom images occur especially when the separation in time of images of a sequence of images becomes less than the delay time of the transfer of charges.

SUMMARY OF THE INVENTION

It is, inter alia, an object of the invention to provide an image detection array which is arranged to produce an electronic image signal wherein artifacts due to memory effects because of delayed transfer of charges are substantially mitigated.

To achieve this object, an image detection device according to the invention is characterised in that the image detection device comprises a correction circuit to form an image correction signal for converting said primary electronic image signal into a corrected image signal by removing artifacts due to delayed charged transfer from the primary electronic image signal.

An image detector array may have the form of a two-dimensional image detection matrix for detecting e.g. light-images or images produced by irradiating an object by x-radiation. An image detector may alternatively have the form of a one-dimensional line-detector e.g. for use in a computed tomography apparatus or for scanning an image. The primary electronic image signal may be further processed, such as conversion into a digital image signal and processing steps not related to delayed charge transfer may be performed, e.g. correction for differences in sensitivities of radiation sensitive elements or correction for fixed-pattern noise. Thus an image signal is derived from the primary electronic image signal, which image signal also contains artifacts due to delayed charge transfer. When a sequence of images is detected by an image detection array, and charges are read-out and converted into a primary electronic image signal, this primary electronic image signal comprises image information of an image of the sequence but it is also contaminated by charges pertaining to preening images of the sequence because charges of said preceding images were trapped for some time since the relevant preceding image was detected. In an image detection device according to the invention there is provided a correction circuit to form said image correction signal that is representative for the delayed charges which lead to contamination and reduction of the amplitude of the electronic image signal. The image correction signal is representative for said artifacts, so that said artifacts are removed by assembling a corrected image signal from the image signal and the image correction signal. The corrected image signal is employed to display or to archive a corrected image. The corrected images which are subsequently to be examined are substantially free of artifacts due to delayed charge transfer.

A preferred embodiment of an image detection device in accordance with the invention is characterised in that the correction circuit comprises at least one frame memory to delay at least one image signal being derived from said primary electronic image signal and to store (a) delayed image-signal(s), at least one multiplier to multiply said delayed image signal(s) by (a) respective weight-factor(s), an arrangement to form said correction signal as a weighted sum of said delayed weighted image signal(s), and a subtracter to form said corrected image signal by subtracting said image correction signal from said image signal.

In order to form said image correction signal being representative of delayed transferred charges an image signal being contaminated with artifacts due to delayed transferred charges is applied to one or more frame delay memories. Consequently, a number of images preceding a currently read-out image are stored in the frame memories. The images in the frame memories are multiplied by weight factors, so as to form weighted image signals. The weight factors are decreasing for images which are located further to the beginning of the sequence of images. Thus, earlier images are multiplied by smaller weight factors and more recent images are multiplied by larger weight factors. The weight factors for respective frame memories are determined in accordance with the time-dependence of the delayed charge transfer, inter alia, due to thermal release of charges that were trapped in energy levels within the bandgap of the semiconductor material. Thus summing of the weighted image signals constitutes said image correction signal which substantially comprises the image artifacts due to delayed charge transfer. The extent to which said image correction signals adequately comprises said artifacts is increased as more frame memories are provided in the correction circuit. Consequently, even a rather complicated time-behaviour of delayed charge transfer giving rise to artifacts of decaying phantom-images in the image currently being read-out is adequately corrected by an image detection device according to the invention.

A further preferred embodiment of an image detection device in accordance with the invention is characterised in that the correction circuit is arranged to receive a succession of image signals derived from a sequence of primary electronic image signals of a sequence of images detected by the image detection array, and in that the correction circuit comprises (a) frame memory(ies) to each of which said image signals of said succession are successively added, and in that the frame-memory(ies) are coupled to (an) arithmetic element(s) arranged to multiply contents of (a) respective frame-memory(ies) by (a) respective decay factor, each time an image signal of said succession is added to the frame-memory(ies), and in that (a) multiplier(s) are (is) connected in series with the frame-memory(ies), to form (a) weighted cumulative sum(s) of decayed image signals, and in that the correction circuit comprises an arrangement to form said image correction signal as a total of said weighted cumulative sum(s), and the correction circuit comprises a subtracter to form said corrected image signal by subtracting said image correction .signal from said image signal.

Artifacts in the form of phantom images are due to delayed charge transfer and when delayed release of charge is very slow this is particularly detrimental to image quality of an image which is formed from an electronic image signal which itself is formed from charges which are induced in the radiation sensitive elements by absorption of radiation. In order to provide said image correction signal which comprises a superposition of delayed image signals having a slow time-decay of the delayed image signals is formed. To that end, use is made of an approximation of function which is slowly decreasing with time as a weighted sum of decreasing exponential functions. Notably, the phantom-artifacts are caused by charges being delayed released with a time behaviour which is substantially as 1/t.

The time dependence of delayed release of charges is expressed as $$1/t \approx \mathbb{E} g_i \exp(-t/\tau_i).$$

A suitable choice of the values of the weight-factors $g_i$ provides a fair approximation of a slowly decaying function as a series of exponential functions. The shown expansion of the function $1/t$ is a particular example which is relevant for describing the delayed charge transfer in the semiconductor image detection array.

To assemble said image correction signal, each image signal of a succession of image signals associated with a sequence of images detected by the image detection array is added to at least one frame-memory. To the contents of each frame-memory exponential decay is applied by multiplying the contents by a decay factor at a predetermined rate, i.e. at constant time intervals. Each frame-memory is coupled in series with a multiplier to perform multiplication with the weight-factor(s) $g_i$ to form a weighted cumulative sum of decaying image signals and an addition means is provided as an arrangement to form said image correction signal to total said sums. Said total fairly accurately represents a sum of slowly (e.g. as 1/t) decayed image signals preceding the digital image signal that pertains to a current image and therefore said total is representative for delayed transferred charges.

To assemble a corrected image signal said image correction signal is subtracted from the image signal being derived from the primary electronic image signal in order to remove the artifacts due to delayed charge transfer.

A further preferred embodiment of an image detection device in accordance with the invention is characterised in that the correction signal is arranged to receive a succession of image signals derived from a sequence of primary electronic image signals of a sequence of images detected by the image detection array, and in that the correction circuit comprises arithmetic means to compute respective dynamic parameters from a current image signal of said succession, and updating means to compute current occupation function-values for respective semiconductor elements and for the current image signal from said dynamic parameters and from stored previous occupation function-values for respective semiconductor elements and for a previous image signal, and conversion means to compute values of delayed transferred charges from said current occupation function-values, and an arrangement to form said image correction signal from the computed values of delayed transferred charges, and the correction circuit comprises a subtracter to form said corrected image signal by subtracting said image correction signal from said image signal.

The occupation functions of trapping levels evolve in time as described by differential equations which take into account thermal release of charges and trapping of charges which are released from the valence band of the semiconductor material due to the absorption of radiation. Comparatively simple representations of the semiconductor band-structure with energy levels within the bandgap lead to differential equations having a comparatively simple form but also representing a fair approximation of the dynamics of the occupation of energy levels within the bandgap. A current occupation function-value is computed by employing discrete time-steps from a previous occupation function-value and dynamic parameters that occur as coefficients in the differential equations. These parameters are computed from the current image signal of said succession of image signals. The current occupation function-values are used for computing delayed transferred charges in the radiation sensitive elements. Subsequently, said image correction signal is formed that is representative for said delayed transferred charges and a corrected image signal is assembled by subtracting said image correction signal from the current image signal.

An x-ray examination apparatus comprising an image detection device which incorporates an image detection array, preferably comprises a correction circuit to form an image correction signal for converting said primary electronic image signal into a corrected image signal by removing artifacts due to delayed charge transfer from the primary electronic image signal.

When an x-ray examination apparatus is operated in a fluoroscopy mode a sequence of images is made at a comparatively low-dose by continuous or pulsed irradiation of a patient and repeatedly reading-out the image detection array. In this use of an image detection array it is particulary advantageous to form a corrected image signal which does not contain artifacts in the form of phantom-images because then the diagnostic quality of the sequence of images formed from the corrected image signal is substantially improved. Especially, image quality of fluoroscopic images is improved when fluoroscopy is alternated with x-ray exposure at high-doses to form x-ray images with a high contrast.

BRIEF DESCRIPTION OF THE DRAWINGS

These and other aspects of the invention will become apparent from and will be elucidated with reference to the embodiments described hereinafter and with reference to the accompanying drawings, where.

DETAILED DESCRIPTION OF THE PREFERRED EMBODIMENT

Figure 1:
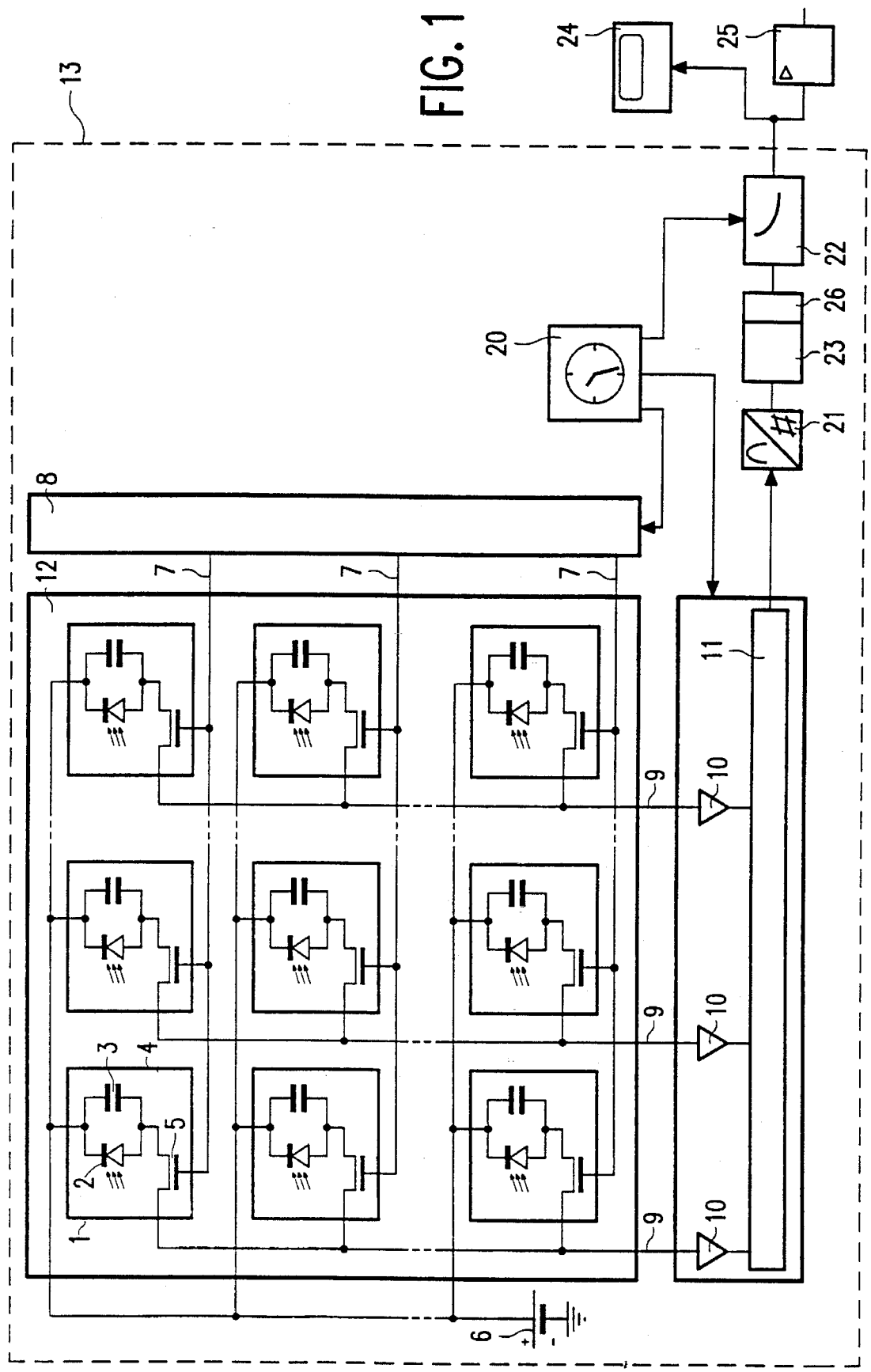
FIG. 1 shows a diagrammatic representation of an image detection device in accordance with the invention.

FIG. 1 shows a diagrammatic representation of an image detection array in accordance with the invention. A plurality of radiation sensitive elements are arranged in a matrix so as to form an image detection matrix 12. The individual sensor elements 1 all have an identical construction. Each sensor element 1 comprises a photodiode 2 and a storage capacitance 3, for which the self-capacitance of the photodiode is employed. Each sensor element 1 comprises a first electrode 4 which is provided only at the area of the relevant sensor element and which is mechanically and electrically separated from the first electrodes 4 of the neighbouring sensor elements. Each of the first electrodes 4 is connected to the storage capacitance of the relevant sensor element. the connection between the first electrode 4 and the storage capacitance 3 is connected to a source terminal of a field effect transistor 5.

For example, 2000×2000 of such sensor elements may be provided in an image detection matrix. For the sake of clarity, however, only a matrix having three rows and three columns is shown. The sensor elements 1 formed in a semiconductor layer e.g. α-Si:H, which at least covers all first electrodes 4 of all sensor elements 1 of the matrix. The semiconductor layer itself is covered by an electrically conductive layer which serves as a common second electrode and acts as such for all sensor elements 1 of the matrix. The common second electrode is connected to a direct voltage source 6, so that the common second electrode can be biased by means of the direct voltage source. When radiation, notably consisting of x-rays, is incident on the semiconductor layer, the radiation changes the conductivity of the semiconductor layer because the radiation is absorbed in the semiconductor material and excites valence-band electrons to the conduction band so that free charge carriers are created substantially in situ of the place of incidence of the radiation. Because a bias voltage is supplied by the dc-voltage source 6 a charge shift takes place which causes the storage capacitances 3 of the sensor elements to be electrically charged. The degree of charging of each of the sensor elements depends on the amount of radiation incident of the semiconductor layer at the area between the first electrode of the relevant sensor element and the common second electrode during a predetermined time duration.

The charges stored in the storage capacitances 3 can be read-out in order to form an electronic image signal. To that end, for each row of sensor elements there is provided a respective switching-line 7, which lines are connected to the gate terminals of the field effect transistors 5 of the sensor elements of the relevant row and they are controlled by a row-control-circuit 8. The row-control-circuit 8 can for example activate the switching-line 7 of the first row so that the field effect transistors 5 of the sensor elements of this row are made conductive. The charges stored in the storage capacitances 3 of this row are then transferred via respective read-lines 9 which are provided for each column of the matrix and which is connected to the drain terminals of the field effect transistors of the sensor elements of the relevant column. Thus, a read-operation is simultaneously performed for all sensor elements of a relevant row. After amplification of the resultant signals in amplifiers 10, the amplified signals are applied to a read-out circuit being a multiplex-circuit 11 which forms a primary electronic image signal in the form of a serial output signal of the parallel arriving signals of the sensor columns. A timing-circuit 20 is connected to the row-control circuit 8 and to the multiplex-circuit 11 to carry-out time coordination of the read-out operation of the sensor elements. The image detection matrix 12, together with the amplifiers 10, the multiplex circuit 11, the row-control circuit 8 and further control-means such as the timing-circuit 20, analog-to-digital-converter 21, correction-circuit 22 and the video signal processor 23 form an image detection-device 13 that converts an image carrying incident radiation beam via a primary electronic image signal into a corrected digital image signal. The primary electronic image signal of the multiplex-circuit 11 is applied to an analog-to-digital converter 21 to form a digital image signal S. The digital image signal may contain phantom-artifacts due to delayed charge transfer in the image detection matrix. Furthermore, the digital image signal S may contain other artifacts, such as fixed-pattern noise and artifacts due to differences in sensitivities between various sensor elements. A correction-circuit 22 is provided to perform correction of phantom-artifacts in that said image correction signal having the form of a lag-correction signal, being representative of delayed transferred charges is supplied by the correction circuit. A video signal processor 23 is provided to perform corrections of other artifacts, viz. correction of fixed-pattern noise and gain corrections to compensate differences of sensitivities of respective sensor elements. The video-signal processor 23 is also arranged to carry-out dark-current corrections for each of the sensor elements; to that end for each of the sensor elements a dark-current value is stored in a look-up table 26 which is incorporated in the video-signal processor. In FIG. 1, the video-signal processor 23 and the correction-circuit 22 are shown coupled in series, so that a corrected image signal is supplied at the output for the correction-circuit 22. Alternatively, the video-signal processor 23 and the correction-circuit 22 may be coupled in parallel and the output-signal of both the video-signal processor and the correction circuit are then assembled into said corrected image signal. The corrected digital image signal is finally applied to a monitor 24 to display an image from which artifacts are removed, or the corrected digital image signal is applied to a buffer-circuit 25 for further processing or archiving.

Figure 2:
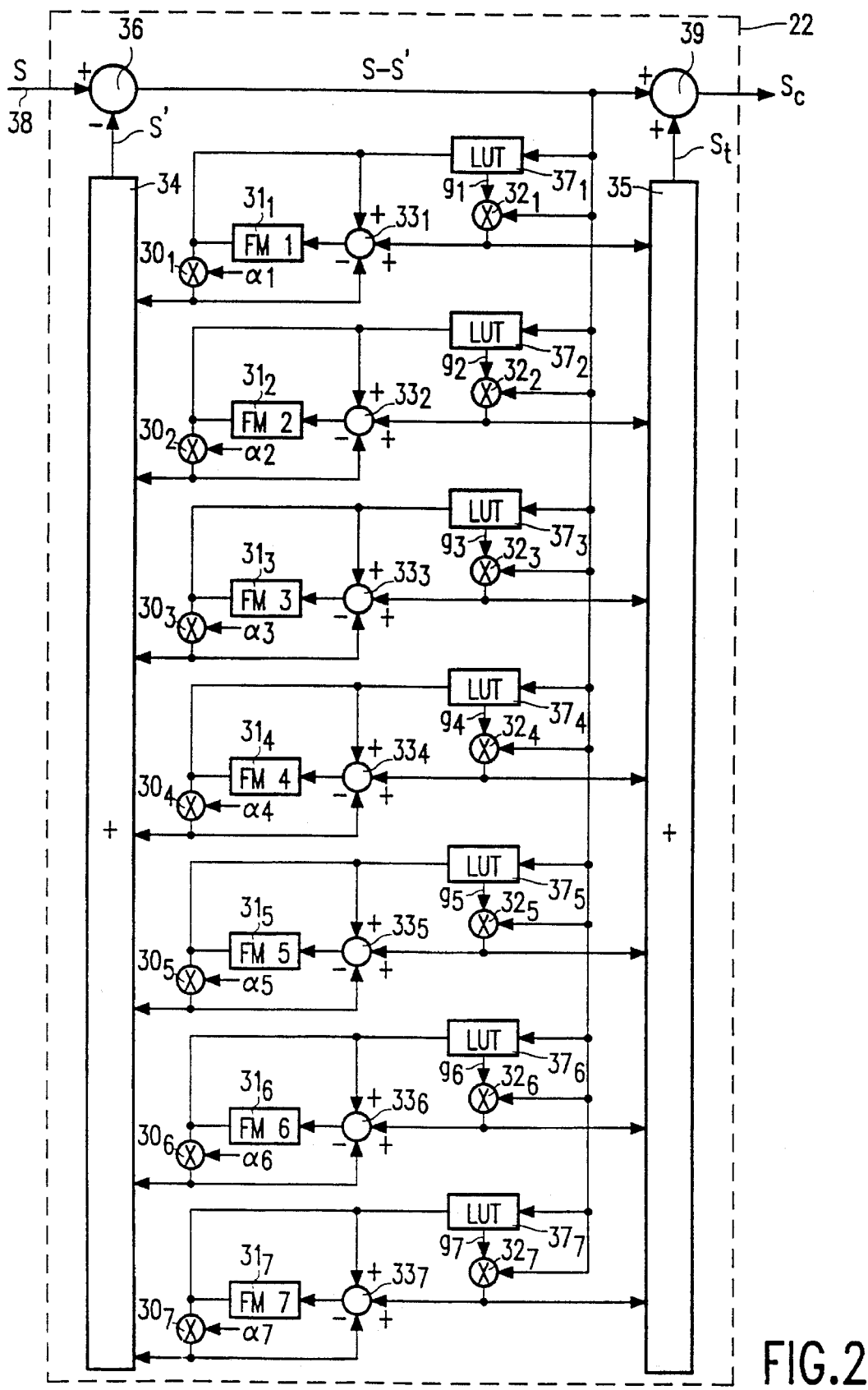
FIG. 2 shows a diagrammatic representation of an embodiment of a correction circuit of an image detection device in accordance with the invention.

FIG. 2 shows a diagrammatic representation of an embodiment of a correction circuit of an image detection device in accordance with the invention. Delay and memory effects in the primary electronic image signal supplied by the radiation sensitive multiplex-circuit 11 are caused by slow decay of charges that have been generated and are subsequently trapped in the semiconductor material of the radiation sensitive elements. This decay may be described as an algebraically slow decrease with time t, e.g. ~1/t. A fair approximation of such an algebraic decay is provided by a superposition of a plurality of exponentially decaying functions with distinct decay times. A sequence of image signals is derived from primary electronic image signals pertaining to a sequence of images detected by the image detection matrix. The sequence of image signals is supplied to the image correction circuit 22, wherein a plurality of multipliers $32_{1-7}$ is provided to multiply the image signal by respective weight-factors $g_{1-7}$. Each of weighted image signals is added by respective addition-devices $33_{1-7}$ to a respective frame-memory $31_{1-7}$. Arithmetic elements $30_{1-7}$ are coupled to the frame-memories to multiply repeatedly at a predetermined rate the contents of the frame-memories by respective factors $\alpha_{1-7}$, thus causing the contents of the frame-memories $31_{1-7}$ to decay exponentially with the time lapsed from the start of the image sequence. To that end the timing-circuit 20 is arranged to supply a control-signal to the respective arithmetic elements $30_{1-7}$. When the control-signal is received by an arithmetic element a multiplication of the content of the associated frame memory is performed by a fixed fraction $\alpha_{1-7}$ that is determined by the characteristic decay time of the exponential decay generated by the arithmetic element. Each of the arithmetic elements thus performs repeatedly multiplication of the contents of the respective frame memories $31_{1-7}$ with respective distinct fixed fractions. Each time an image signal of a next image of the sequence is supplied to the correction circuit 22, the contents of the frame-memories $31_{1-7}$ are updated with appropriate weighted signal fractions which are associated with delayed transferred charges at the time of supply of said next image signal. At each time the respective frame-memories $31_{1-7}$ contain a cumulative sum of exponentially decaying image-signals of, in principle all, previous images of the image sequence multiplied by a respective weight-factor $g_{1-7}$. The values of the weight-factors $g_{1-7}$ are made dependent on images which were detected previously by the image detection matrix as well as on the image signal that is currently being supplied to the correction-circuit 22. The delayed transfer of charges depends on the amount of previous irradiation by which energy-levels in the bandgap of the semiconductor material were occupied. A plurality of look-up tables $37_{1-7}$ are provided. Each of these look-up tables is coupled to one of the frame-memories $31_{1-7}$ and to a subtractor 36 which forms a first correction signal S', which is the difference between the image signal S and a signal that is representative for the delayed transferred charges. On the basis of the contents of the frame-memory $31_1$ and the first correction signal S' a value for the weight-factor $g_1$ is supplied from the look-up table $37_1$ to the multiplier $32_1$. Similarly, relevant values for the other weight-factors $g_{2-7}$ are provided. The output terminals of the respective multipliers $30_{1-7}$ are connected to an addition-device 34 which supplies a summed total of the contents of the frame-memories $31_{1-7}$ to the subtractor 36. In the embodiment of a correction circuit shown in FIG. 2, a sum of seven terms is employed by way of example; the actual number of terms which is required depends on the desired accuracy of the corrected digital image signal. Said total fairly accurately represents a sum of slowly (e.g. as 1/t) decayed image signals preceding the digital image signal that pertains to a current image and therefore said total is representative for delayed transferred charges. Said total is applied as said first correction signal to a subtracter 36, which subtracts said image correction signal from said digital image signal S, so as to form the first corrected image signal S—S'. A correction to the extent that artifacts due to delayed transferred charges are reduced is carried out when the first corrected image signal is formed. In another addition device 35 the outputs of the multipliers $32_{1-7}$ are added to form an auxiliary signal $S_t$ which is representative for the signal amplitude reduction owing to trapping of charges generated upon detecting the latest image of said sequence. The auxiliary signal $S_t$ is added to the first corrected signal S—S', by a further addition device 39 resulting in a further corrected image signal $S_c$ equal to S—S'+$S_t$. As a consequence a further correction in that signal amplitude reduction is compensated is carried out when said further corrected signal is formed. Because the frame-memories $31_{1-7}$ are repeatedly updated to keep the cumulative sums of decaying previous images, the embodiment of a correction circuit as shown in FIG. 2 is particulary advantageous for use when a stream of primary electronic image signals pertaining to a sequence of images is produced by the image detection matrix. In particular that is the case when the image detection matrix forms part of an x-ray examination apparatus which is operated in fluoroscopy mode.

Figure 3:
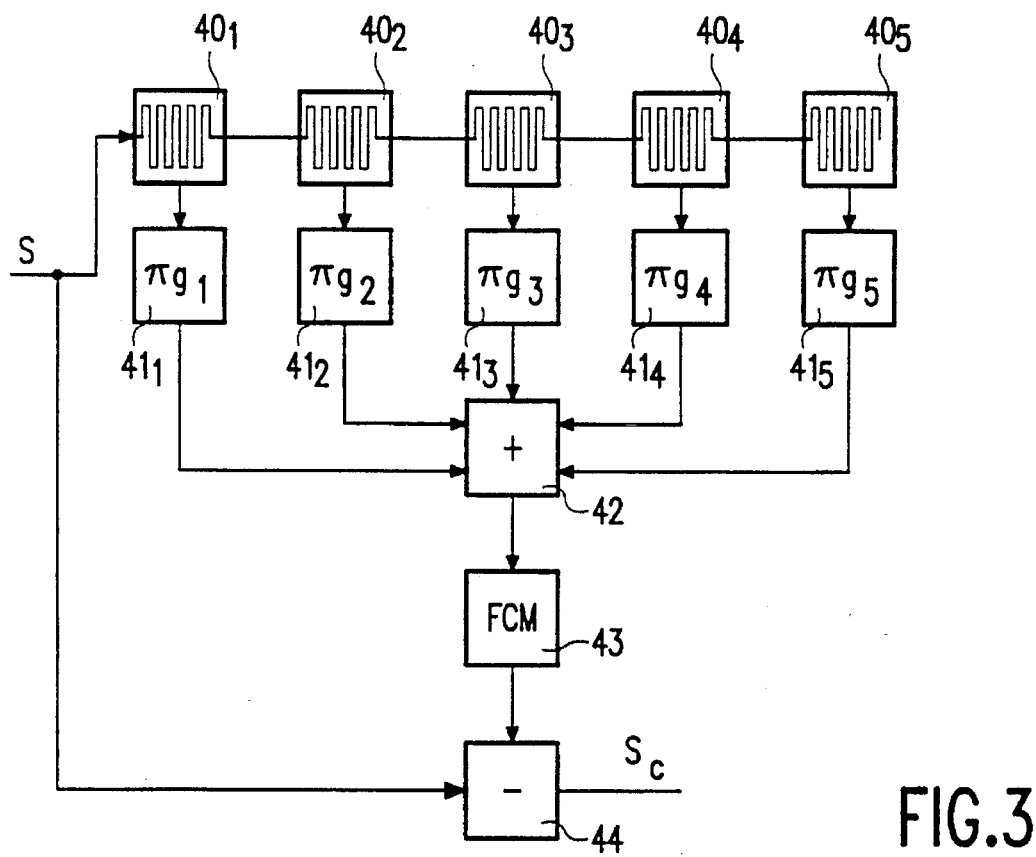
FIG. 3 shows a diagrammatic representation of another embodiment of a correction circuit of an image detection device in accordance with the invention.

FIG. 3 shows a diagrammatic representation of another embodiment of a correction circuit of an image detection device in accordance with the invention. The digital image signal S is supplied to a multitude of frame delay-memories $40_{1-5}$, of which there are shown five by way of example. The required number of frame delay-memories depends on the desired accuracy of the corrected digital image signal. The required number of frame delay-memories increases when trapped charges are released more slowly so that transfer of charges to the multiplex-circuit 11 is subject to longer delay. In the set of respective frame delay-memories $40_{1-5}$ there is stored a time sequence of five delayed images which extends backwards in time with reference to the digital image signal currently supplied by the analog-to-digital converter 21. Each of the delayed images is multiplied by a respective predetermined weight- factor $g_{1-5}$, in respective multipliers $41_{1-5}$. The values of said weight-factors can be determined in advance from the delay properties of the radiation sensitive elements of the image detection matrix. Such delay properties follow inter alia from the energy levels that are involved in trapping of charges in the bandgap of the semiconductor material of the image detection matrix. The respective multipliers $41_{1-5}$ produce outputs in the form of weighted delayed images which are subsequently applied to an addition-device 42 which forms a weighted sum of delayed images. This weighted sum is stored in a frame correction memory 43, which supplies said weighted sum as said image correction signal to a subtracter 44. Said image correction signal is subtracted from the digital image signal S by the subtracter 44, so as to form a corrected digital image.

Figure 4:
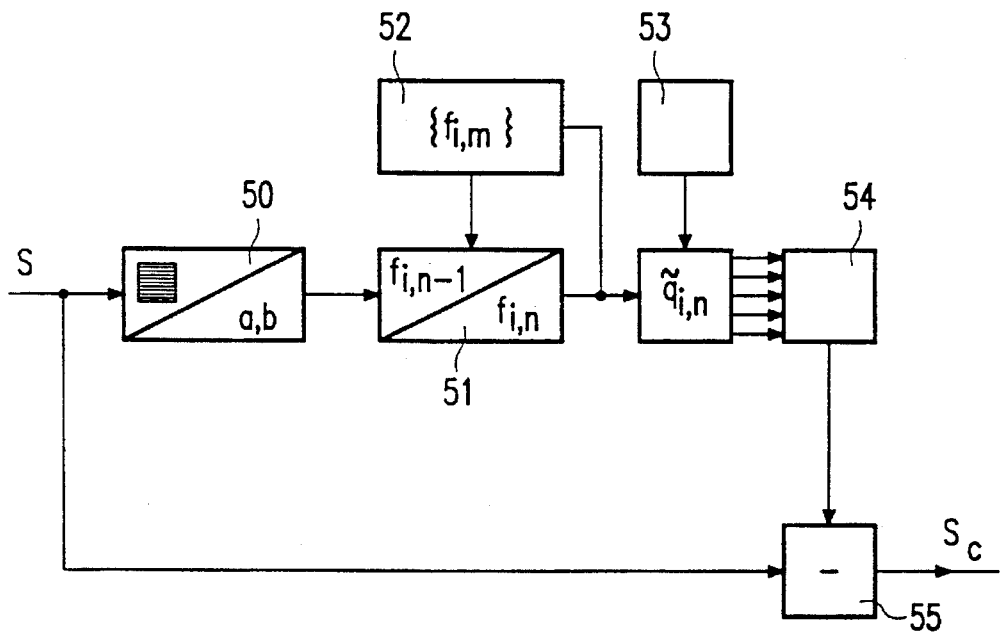
FIG. 4 shows a diagrammatic representation of yet another embodiment of a correction circuit of an image detection device in accordance with the invention.

FIG. 4 shows a diagrammatic representation of yet another embodiment of a correction circuit of an image detection device in accordance with the invention. A succession of image signals derived from a sequence of primary electronic image signals of a sequence of images detected by the image detection array is applied to an arithmetic means 50 to compute a number of dynamic parameters for a current image signal. As a particulary attractive example the dynamic parameters have the form of occupation-change rates $a_i$ and occupation regression rates $b_i$ for each of the radiation sensitive elements i. These parameters depend on relevant trapping energy-levels with respect to the bottom of the conduction band of the semiconductor material and the density of states of the trapping levels. The dynamic behaviour incorporates on the one hand trapping in unoccupied levels within the bandgap of the semiconductor of electrons which are excited from the valence band of the semiconductor material by absorption of incident radiation and on the other hand thermal release of electrons from the trapped electrons. Consequently, the delayed transfer of charges is computed from the dynamic behaviour of the occupation functions of the relevant trapping levels $f_i$. The dynamic behaviour of these occupation functions is determined by a collection of differential equations:

$$f_i'(t) + a_i f_i(t) - b_i = 0.$$

A current occupation function for a current image signal can be computed from previous occupation functions for a previous image signal of said succession by discretisation of the ensuing time behaviour. When continuous irradiation is performed, then the discretisation time-step is the frame-time of the images, i.e. the duration of charge conversion for each image. When pulsed irradiation is performed during a sequence of x-ray exposures, then for release of charges the discretisation time-step is again the frame-time but trapping of charges occurs during the x-ray exposure time, i.e. the duration of the x-ray pulses, so that for trapping the pulse-time is to be taken as the discretisation time-step. An updating means 51 is connected to a storage device 52 to compute current occupation functions. The storage device is arranged to contain occupation functions for radiation sensitive elements for a previous image signal. The updating means receives previous occupation functions pertaining to previous image signal and dynamical parameters for the current image signal and generates current occupation functions pertaining to a current image signal as an output. The current occupation functions are taken to the storage device 52 and to a conversion device 53. Thus the contents of the storage device are updated for use in processing of a next image signal. The current occupation functions are convened to values of delayed transferred charges by calculation from the current occupation functions and parameters of the image detection array, such as inter alia the area of the sensor elements and the magnitude of the applied electric field and the mobility of the valence-band electrons in the semiconductor material. Said values for delayed transferred charges are formed into said image correction signal by means of an arrangement 54. Said image correction signal is supplied to a subtracter 55 to subtract said image correction signal form the current image signal so as to form a corrected image signal.

It is noted that in an image detection device in accordance with the invention the functions of the correction circuit, the timing-generator and the video signal processor may be performed by a suitably programmed computer of by a special purpose processor having circuit means that are arranged to perform said functions.

We claim:

1. An image detection device comprising an image detection array which incorporates radiation sensitive elements to convert incident radiation into charges, and read out lines to transfer said charges to a read out circuit which is arranged to convert transferred charges into a primary electronic image signal, wherein the image detection device comprises a correction circuit to form an image correction signal for converting said primary electronic image signal into a corrected image signal by removing artifacts due to delayed charge transfer from the primary electronic image signal.

2. An image detection device as claimed in claim 1, wherein the correction circuit comprises frame memory means for delaying an image signal derived from said primary electronic image signal to produce one or more successively delayed signals, multiplier means for multiplying said delayed image signals by respective weight factors to form respective delayed weighted image signals, combining means for forming said correction signal as a weighted sum of said delayed weighted image signals, and a subtracter for forming said corrected image signal by subtracting said image correction signal from said primary electronic image signal.

3. An image detection device as claimed in claim 2, wherein the correction circuit is arranged to receive a succession of image signals derived from a sequence of primary electronic image signals of a sequence of images detected by the image detection array, and further comprising frame memory means having one or more frame memories into each of which said image signals of said succession are successively added, and multiplier means having multipliers connected in series with the frame memories and arranged to multiply contents of the frame memories by respective decay factors repeatedly at a predetermined rate to form weighted cumulative sums of decayed image signals, and wherein a combining means forms said image correction signal as a total of said weighted cumulative sums, and the correction circuit comprises a subtracter to form said corrected image signal by subtracting said image correction signal from said primary electronic image signal.

4. An image detection device as claimed in claim 1, wherein the correction signal is arranged to receive a succession of image signals derived from a sequence of primary electronic image signals of a sequence of images detected by the image detection array, and wherein the correction circuit comprises arithmetic means to compute respective dynamic parameters from a current image signal of said succession, and updating means to compute current occupation function values for respective semiconductor elements and for the current image signal from said dynamical parameters and from stored previous occupation function-values for respective semiconductor elements and for a previous image signal, and conversion means to compute values of delayed transferred charges from said current occupation function values, and an arrangement to form said image correction signal from the computed values of delayed transferred charges, and the correction circuit comprises a subtracter to form said corrected image signal by subtracting said image correction signal from said image signal.

5. An x-ray examination apparatus comprising an image detection device responsive to x-ray radiation, said detection device comprising an image detection array which incorporates radiation sensitive elements to convert incident radiation into charges, and read out lines to transfer said charges to a read out circuit which is arranged to convert transferred charges into a primary electronic image signal, characterised in that the image detection device comprises a correction circuit to form an image correction signal for converting said primary electronic image signal into a corrected image signal by removing artifacts due to delayed charge transfer from the primary electronic image signal.

* * * * *